(12) United States Patent
Kim et al.

(10) Patent No.: US 10,892,093 B2
(45) Date of Patent: Jan. 12, 2021

(54) MULTILAYER CAPACITOR

(71) Applicant: SAMSUNG ELECTRO-MECHANICS CO., LTD., Suwon-Si (KR)

(72) Inventors: Jeong Ryeol Kim, Suwon-Si (KR); Sun Ho Yoon, Suwon-Si (KR); Jae Hoon Jeong, Suwon-Si (KR); Kyoung Ki Min, Suwon-Si (KR); Jong Han Kim, Suwon-Si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 222 days.

(21) Appl. No.: 16/126,502

(22) Filed: Sep. 10, 2018

(65) Prior Publication Data
US 2019/0304696 A1 Oct. 3, 2019

(30) Foreign Application Priority Data

Mar. 29, 2018 (KR) .......................... 10-2018-0036431

(51) Int. Cl.
*H01G 4/008* (2006.01)
*H01G 4/012* (2006.01)
*H01G 4/30* (2006.01)
*H01G 4/228* (2006.01)

(52) U.S. Cl.
CPC ............ *H01G 4/0085* (2013.01); *H01G 4/012* (2013.01); *H01G 4/30* (2013.01); *H01G 4/228* (2013.01)

(58) Field of Classification Search
CPC ........ H01G 4/005; H01G 4/012; H01G 4/008; H01G 4/0085; H01G 4/30
See application file for complete search history.

(56) References Cited

U.S. PATENT DOCUMENTS

| | | | |
|---|---|---|---|
| 6,316,100 B1 * | 11/2001 | Kodas | ...................... B01J 2/003 257/E21.304 |
| 6,776,861 B2 | 8/2004 | Wang et al. | |
| 2016/0358713 A1 | 12/2016 | Doi et al. | |

FOREIGN PATENT DOCUMENTS

| JP | 2000-021679 A | 1/2000 |
|---|---|---|
| KR | 10-2016-0143517 A | 12/2016 |

* cited by examiner

*Primary Examiner* — Eric W Thomas
(74) *Attorney, Agent, or Firm* — Morgan, Lewis & Bockius LLP

(57) ABSTRACT

A multilayer capacitor includes: a body including dielectric layers and internal electrodes alternately disposed therein; and external electrodes disposed on the body and connected to the internal electrodes. The internal electrodes include a first internal electrode and a second internal electrode. A thickness of the second internal electrode is less than a thickness of the first internal electrode, and an area fraction of ceramics included in the first internal electrode with respect to the first internal electrode is greater than that of ceramics included in the second internal electrode with respect to the second internal electrode.

26 Claims, 6 Drawing Sheets

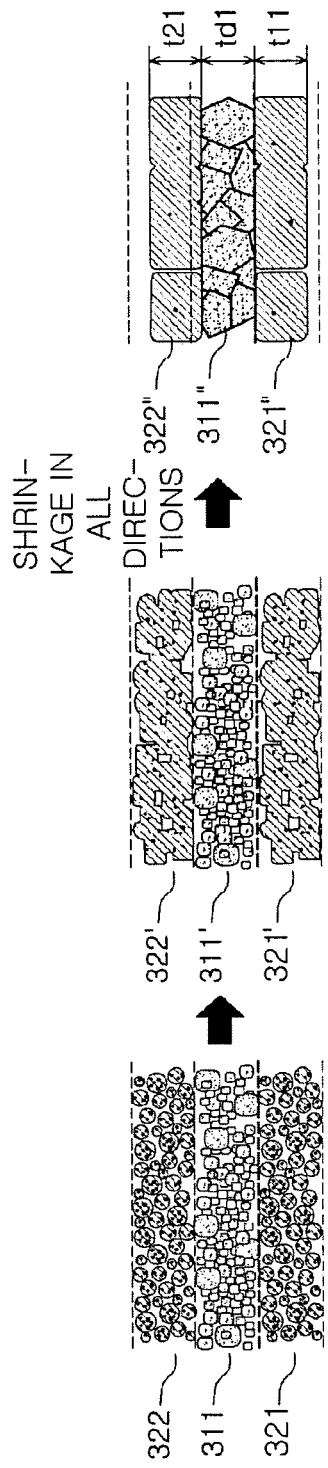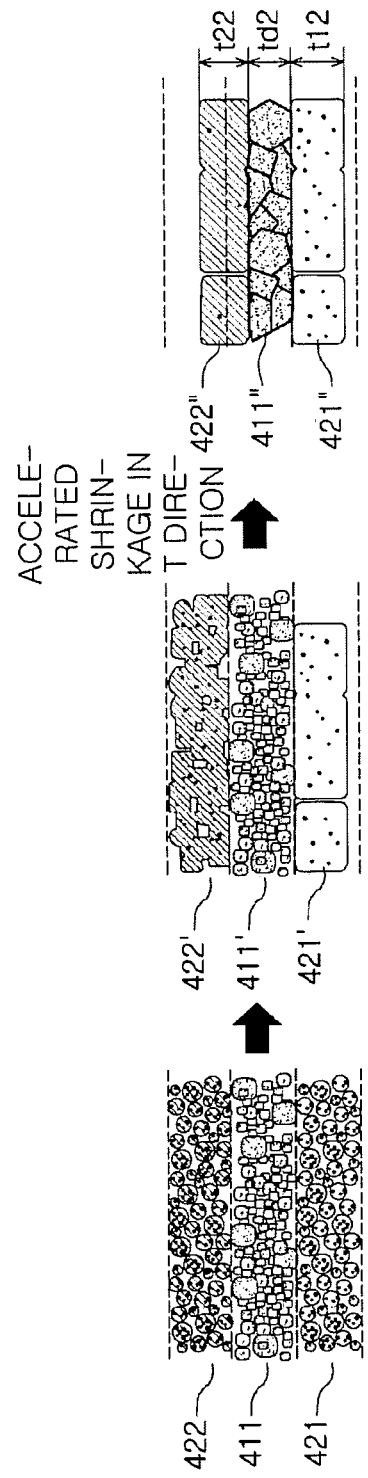

MULTILAYER CAPACITOR

CROSS-REFERENCE TO RELATED APPLICATION(S)

This application claims benefit of priority to Korean Patent Application No. 10-2018-0036431 filed on Mar. 29, 2018 in the Korean Intellectual Property Office, the disclosure of which is incorporated herein by reference in its entirety.

TECHNICAL FIELD

The present disclosure relates to a multilayer capacitor.

BACKGROUND

A multilayer capacitor is a chip-type condenser mounted on the printed circuit boards of various types of electronic products such as an image display apparatus, for example, a liquid crystal display (LCD), a plasma display panel (PDP), or the like, a computer, a smartphone, a cellular phone, and the like, serving to charge or discharge electricity therein or therefrom.

Such a multilayer capacitor may be used as a component of various electronic apparatuses since it is relatively small, implements high capacitance, and is easily mounted. Recently, in accordance with the miniaturization of electronic apparatuses, demand for miniaturization and increases in capacitance of multilayer capacitors has increased.

In order to miniaturize and increase capacitance of such a multilayer capacitor, technology capable of forming an internal electrode and a dielectric layer at a low thickness is required.

SUMMARY

An aspect of the present disclosure may provide a multilayer capacitor in which an internal electrode and a dielectric layer have low thicknesses.

According to an aspect of the present disclosure, a multilayer capacitor may include: a body including dielectric layers and internal electrodes alternately disposed therein; and external electrodes disposed on the body and connected to the internal electrodes, respectively. The internal electrodes may include a first internal electrode and a second internal electrode. A thickness of the first internal electrode may be less than a thickness of the first internal electrode, and an area fraction of ceramics included in the first internal electrode with respect to the first internal electrode may be greater than that of ceramics included in the second internal electrode with respect to the second internal electrode.

In a cross-sectional of the multilayer capacitor, the area fracture of the ceramics included in the first internal electrode may be 1 to 5 area % of the first internal electrode, and the area fracture of the ceramics included in the second internal electrode may be 0.5 area % or less of the second internal electrode.

$1.05 \leq t1/t2 \leq 1.6$ in which $t1$ is a thickness of the first internal electrode and $t2$ is a thickness of the second internal electrode.

The thickness of the first internal electrode may be 0.2 to 1.0 μm, and the thickness of the second internal electrode may be 0.14 to 0.95 μm.

A thickness of the dielectric layer may be 0.14 to 0.95 μm.

The first internal electrode may be made of a conductive paste having a sintering temperature lower than that of a conductive paste for making the second internal electrode.

The first and second internal electrodes may be made of conductive pastes including conductive metal powder particles and ceramic materials, and an average particle size of the conductive metal powder particles included in the conductive paste for forming the first internal electrode may be smaller than that of the conductive metal powder particles included in the conductive paste for forming the second internal electrode.

The first internal electrode may be formed of a conductive paste including conductive metal powder particles and ceramic materials, and an average particle size of the conductive metal powder particles may be 100 nm or less.

The first internal electrode may include a Ni alloy alloyed with one or more materials selected from the group consisting of Cu, Si, and Al.

The second internal electrode may include a Ni alloy alloyed with one or more materials selected from the group consisting of W, Cr, and Co.

The first internal electrode may include a Ni alloy different from a Ni alloy included in the second internal electrode. made The second internal electrode may include a Ni grain, ceramics distributed in the Ni grain, a first coating layer surrounding the Ni grain, and second coating layers surrounding the ceramics.

Each of the first and second coating layers may include one or more materials selected from the group consisting of Ag, Au, Zn, Sn, In, Al, Bi, Sb, Ge, and Te.

The number of first internal electrodes may be two or more, and the second internal electrode may be disposed between the two or more first internal electrodes.

The first and second internal electrodes may be alternately disposed with respective dielectric layers interposed therebetween, and may be alternately exposed through both end surfaces of the body, respectively.

According to another aspect of the present disclosure, a multilayer capacitor may include: a body including dielectric layers and internal electrodes alternately disposed therein; and external electrodes disposed on the body and connected to the internal electrodes, respectively, wherein the internal electrodes include a first internal electrode and a second internal electrode having a thickness lower than that of the first internal electrode, and the second internal electrode includes a Ni grain, ceramics distributed in the Ni grain, a first coating layer surrounding the Ni grain, and second coating layers surrounding the ceramics.

Each of the first and second coating layers may include one or more materials selected from the group consisting of Ag, Au, Zn, Sn, In, Al, Bi, Sb, Ge, and Te.

According to another aspect of the present disclosure, a multilayer capacitor may include a body including a first dielectric layer and first and second internal electrodes connected to each other by the first dielectric layer; and first and second external electrodes disposed on the body and connected to the first and second internal electrodes, respectively. A thickness of the second internal electrode may be less than a thickness of the first internal electrode. The first internal electrode may be made of a first conductive paste having a sintering temperature lower than that of a second conductive paste for making the second internal electrode.

The first internal electrode may include a first Ni alloy alloyed with one or more materials selected from the group consisting of Cu, Si, and Al, and the second internal electrode may include a second Ni alloy alloyed with one or more materials selected from the group consisting of W, Cr, and Co.

The second internal electrode may be made of a conductive paste including conductive metal powder particles and ceramic powder particles, and the conductive metal powder particles are coated with sulfur (S) or carbon (C).

The second internal electrode may include a Ni grain, ceramics coated with second coating layers and distributed in the Ni grain, and a first coating layer surrounding the Ni grain.

Each of the first and second coating layers may include one or more materials selected from the group consisting of Ag, Au, Zn, Sn, In, Al, Bi, Sb, Ge, and Te.

The body may further include a second dielectric layer and third and fourth internal electrodes connected to each other by the second dielectric layer, the first and second external electrodes may be connected to the third and fourth internal electrodes, respectively, a thickness of the fourth internal electrode may be less than a thickness of the third internal electrode, and the third internal electrode may made of the first conductive paste and the fourth internal electrode may be made of the second conductive paste.

The body may further include a second dielectric layer and third and fourth internal electrodes connected to each other by the second dielectric layer, the first and second external electrodes may be connected to the third and fourth internal electrodes, respectively, a thickness of the third internal electrode may be less than a thickness of the fourth internal electrode, and the third internal electrode may be made of the second conductive paste and the fourth internal electrode may be made of the first conductive paste.

BRIEF DESCRIPTION OF DRAWINGS

The above and other aspects, features, and advantages of the present disclosure will be more clearly understood from the following detailed description taken in conjunction with the accompanying drawings, in which:

FIGS. 4A through 4C are views sequentially illustrating processes of sintering a general multilayer capacitor according to the related art, which is a Comparative Example;

FIGS. 5A through 5C are views sequentially illustrating processes of sintering a multilayer capacitor according to an exemplary embodiment in the present disclosure, which is an Inventive Example;

DETAILED DESCRIPTION

Figure 1:
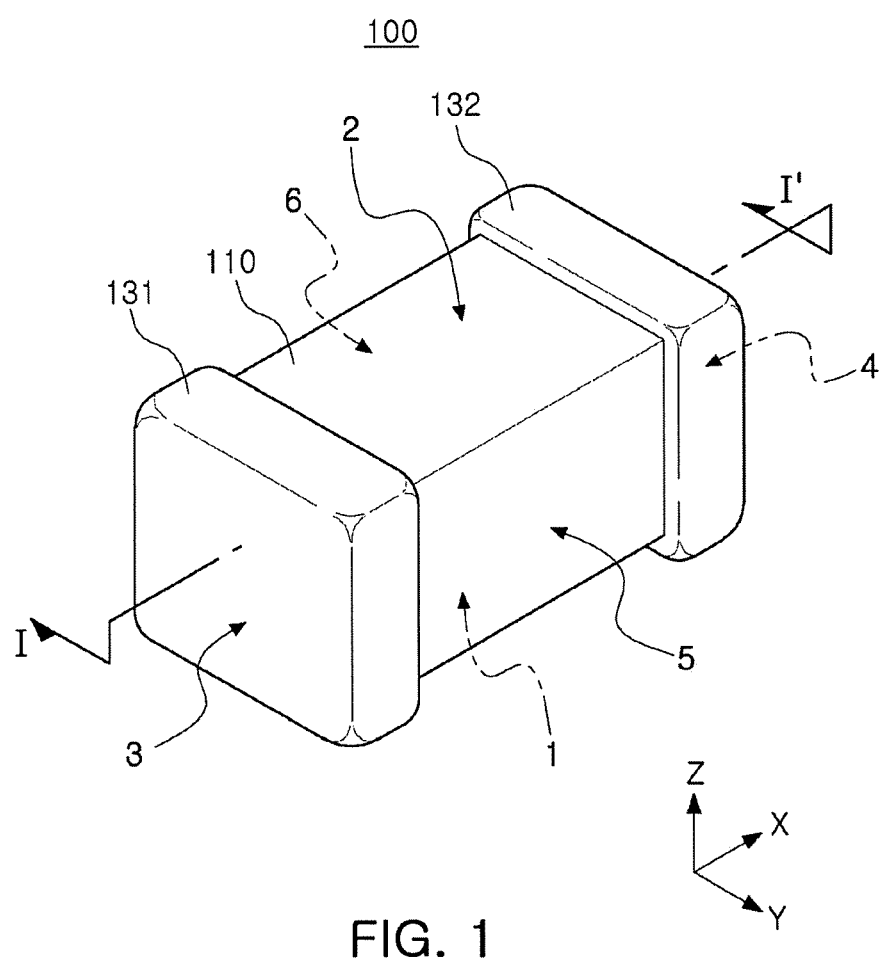
FIG. 1 is a schematic perspective view illustrating a multilayer capacitor according to an exemplary embodiment in the present disclosure.

Hereinafter, exemplary embodiments of the present disclosure will now be described in detail with reference to the accompanying drawings.

In the drawings, an X direction refers to a first direction or a length direction, a Y direction refers to a second direction or a width direction, and a Z direction refers to a third direction or a thickness direction.

Multilayer Capacitor

Figure 2A:
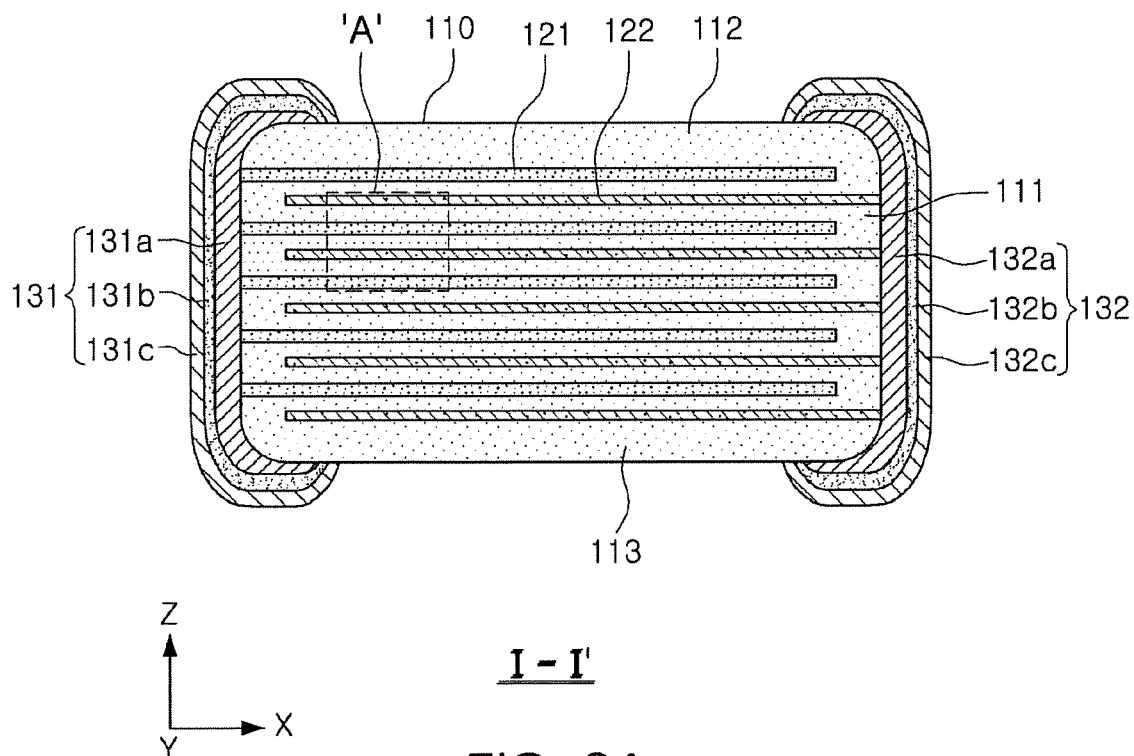
FIG. 2A is a cross-sectional view taken along line I-I' of FIG. 1.
Figure 2B:
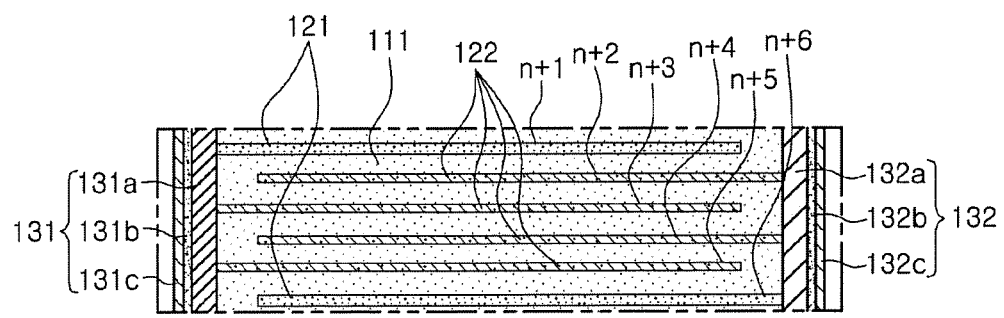
FIG. 2B is a cross-sectional view of a portion of a capacitance forming region of a multilayer capacitor according to an exemplary embodiment in the present disclosure.
Figure 3:
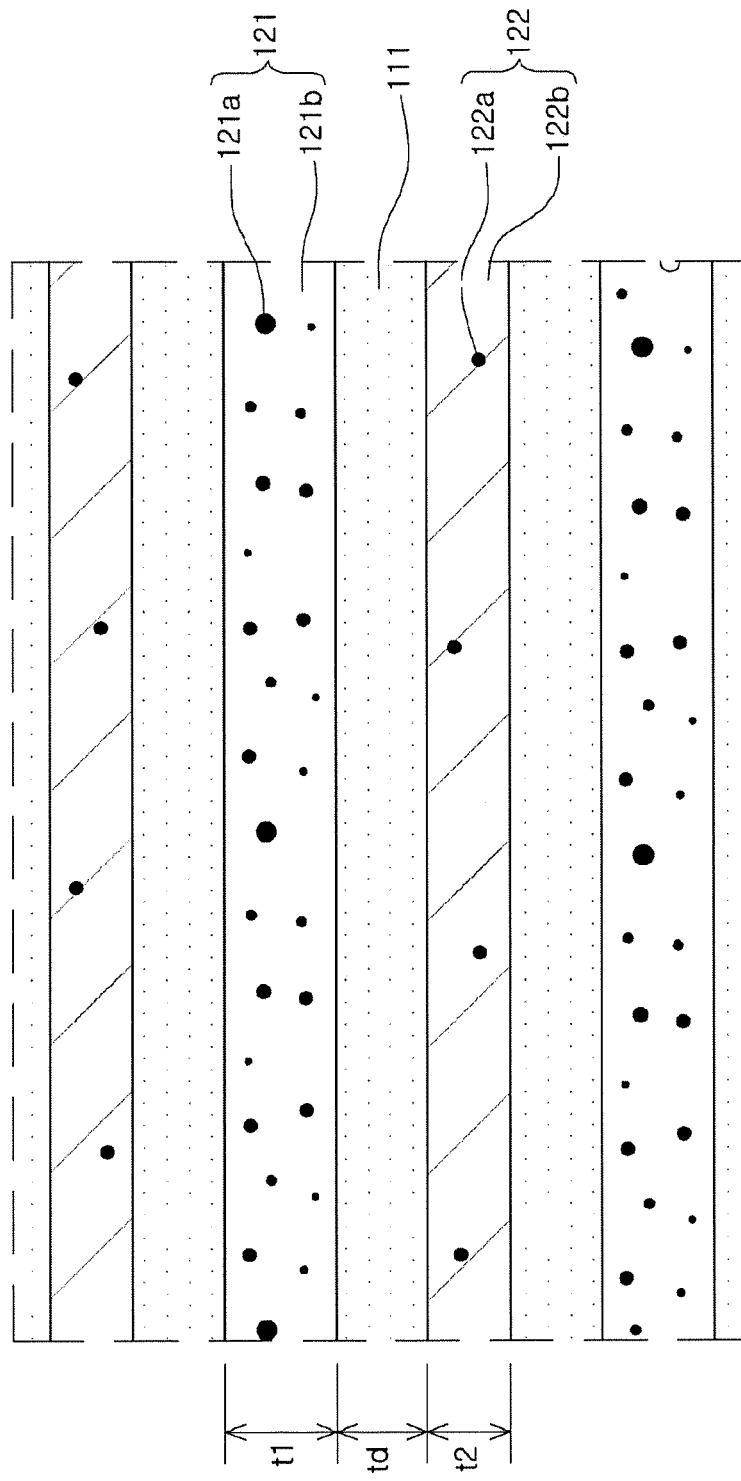
FIG. 3 is an enlarged view of part A of FIG. 2A.

FIG. 1 is a schematic perspective view illustrating a multilayer capacitor according to an exemplary embodiment in the present disclosure. FIG. 2A is a cross-sectional view taken along line I-I' of FIG. 1. FIG. 2B is a cross-sectional view of a portion of a capacitance forming region of a multilayer capacitor according to an exemplary embodiment in the present disclosure. FIG. 3 is an enlarged view of part A of FIG. 2A.

Referring to FIGS. 1 through 3, a multilayer capacitor 100 according to an exemplary embodiment in the present disclosure may include a body 110 including dielectric layers 111 and internal electrodes 121 and 122 alternately disposed therein, and external electrodes 131 and 132 disposed on the body 110 and connected to the internal electrodes 121 and 122, respectively. The internal electrodes may include first and second internal electrodes 121 and 122, and an area fraction of ceramics included in the first internal electrode 121 may be greater than that of ceramics included in the second internal electrode 122.

The body 110 may include the dielectric layers 111 and the internal electrodes 121 and 122 alternately stacked therein.

A shape of the body 110 is not particularly limited, but may be a hexahedral shape or a shape similar to the hexahedral shape, as illustrated in FIG. 1. Although the body 110 does not have a hexahedral shape having perfectly straight lines due to shrinkage of ceramic powder particles included in the body 110 in a sintering process, the body 110 may have substantially the hexahedral shape.

The body 110 may have first and second surfaces 1 and 2 opposing each other in the thickness direction (the Z direction), third and fourth surfaces 3 and 4 connected to the first and second surfaces 1 and 2 and opposing each other in the length direction (the X direction), and fifth and sixth surfaces 5 and 6 connected to the first and second surfaces 1 and 2, connected to the third and fourth surfaces 3 and 4, and opposing each other in the width direction (the Y direction).

The plurality of dielectric layers 111 forming the body 110 may be in a sintered state, and adjacent dielectric layers 111 may be integrated with each other so that boundaries therebetween are not readily apparent without using a scanning electron microscope (SEM).

A raw material of the dielectric layer 111 is not particularly limited as long as sufficient capacitance may be obtained. For example, the raw material of the dielectric layer 111 may be barium titanate ($BaTiO_3$) powder particles. A material of the dielectric layer 111 may be prepared by adding various ceramic additives, organic solvents, plasticizers, binders, dispersing agents, and the like, to powder particles such as the barium titanate ($BaTiO_3$) powder particles, or the like, according to an object of the present disclosure.

The body 110 may include cover layers 112 and 113 formed at an upper portion and a lower portion thereof, respectively. The cover layers 112 and 113 may be formed by stacking dielectric layers on which internal electrodes are not formed. The cover layers 112 and 113 may serve to maintain reliability of the multilayer capacitor 100 against external impact.

The internal electrodes 121 and 122 may include the first and second internal electrodes which include the ceramics 121a and 122a and the conductive metal 121b and 122b, and the area fraction of the ceramics 121a included in the first internal electrode 121 is greater than that of the ceramics 122a included in the second internal electrode 122. This may be to form the second internal electrode 122 and the dielectric layer 111 at low thicknesses, and will be described in detail below.

As a general method according to the related art for thinning the dielectric layer and the internal electrodes, there is a method of casting a ceramic sheet at a low thickness and printing and then sintering a conductive paste for forming the internal electrode at a low thickness. However, in such a method, shrinkage is generated in all directions or a shrinkage is substantially the same in all direction in a sintering process, such that an electrode breakage phenomenon may occur, and a short-circuit defect rate may be increased due to a defect of the ceramic sheet having the low thickness.

On the other hand, in the present disclosure, thinness of the dielectric layer and the internal electrodes may be achieved by controlling shrinkage behavior in a sintering process rather than simply printing the conductive paste at a reduced thickness and thinning the ceramic sheet.

In the sintering process, generally, shrinkage of 15 to 25% is generated in all of the X direction, the Y direction, and the Z direction in the related art. In the present disclosure, shrinkage in the Z direction (the thickness direction) is controlled to dominate as compared to shrinkage in the X direction (the length direction) and shrinkage in the Y direction (the width direction) by using constrained sintering technology, such that the thinness of the dielectric layer and the internal electrodes may be achieved. The constrained sintering technology refers to a technology of allowing shrinkage of a sintering target in the sintering process to mainly be generated in a vertical direction by sintering the sintering target in a state in which a plate that is not shrunk or is less likely to shrink in the sintering process is brought into contact with the sintering target in the vertical direction.

In the present disclosure, a sintering temperature of a conductive paste for forming the first internal electrode 121 and a sintering temperature of a conductive paste for forming the second internal electrode 122 may be controlled to be different from each other. For example, the sintering temperature of the conductive paste for forming the first internal electrode 121 may be lower than the sintering temperature of the conductive paste for forming the second internal electrode 122. Therefore, the first internal electrode 121 may be sintered at a low temperature to become physically hard, and may induce shrinkage of the second internal electrode 122 and the dielectric layer 111 to be accelerated in the thickness direction when the second internal electrode 122 and the dielectric layer 111 sintered at a temperature higher than the temperature at which the first internal electrode 121 is sintered are sintered and shrunk. Therefore, the second internal electrode 122 and the dielectric layer 111 may be formed at the reduced thicknesses because of the accelerated shrinkage of the second internal electrode 122 and the dielectric layer 111 in the thickness direction induced by sintering the first internal electrode 121.

The sintering temperature may have an influence on an area % of ceramics trapped in the internal electrode. When the sintering temperature of the conductive paste is low, sintering of the ceramics included in the conductive paste is completed before the ceramics are discharged externally of the internal electrode, such that an area fracture of the ceramics trapped in the internal electrode is increased, and when the sintering temperature of the conductive paste is high, most of the ceramics included in the conductive paste are discharged externally of the internal electrode, such that an area fracture of the ceramics trapped in the internal electrode is decreased.

The area fracture of the ceramics 121a included in the first internal electrode 121 may be 1 to 5 area % of the first internal electrode 121, and the area fracture of the ceramics 122a included in the second internal electrode 122 may be 0.5 area % or less of the second internal electrode 122.

The area fractions of the ceramics included in the first and second internal electrodes 121 and 122 may be measured by observing a cross section of the body 110 in a length-thickness (X-Z) direction. For example, the area fractions of the ceramics in the first and second internal electrodes 121 and 122 may be values obtained by measuring an area occupied by all of the ceramics in an entire area of the first internal electrode and an area occupied by all of the ceramics in an entire area of the second internal electrode on the cross section of the body 110 in the length-thickness (X-Z) direction at the center of the body 110 in the width direction (the Y direction). For the purpose of accurate comparison, the area fractions of the ceramics in the first and second internal electrodes 121 and 122 may be observed on the same cross section, and may be average values observed and measured after the internal electrode is divided in a length unit of 2 μm on the cross section of the body 110 in the length-thickness (X-Z) direction.

When the area fracture of the ceramics 121a included in the first internal electrode 121 is less than 1 area %, it means that a sintering temperature difference between the first internal electrode 121 and the second internal electrode 122 is not great enough, and the first and second internal electrodes may thus be sintered at a similar temperature, such that constrained sintering may not be sufficiently conducted.

On the other hand, when the area fracture of the ceramics 121a included in the first internal electrode 121 exceeds 5 area %, a non-electrode region in the first internal electrode may be increased, such that it may be difficult to secure capacitance. In addition, a thickness of the first internal electrode 121 may be increased to offset an effect of decreasing a thickness of the second internal electrode 122, such that it may be difficult to achieve miniaturization of the multilayer capacitor.

Therefore, the area fraction of the ceramics included in the first internal electrode may be, preferably, 1 to 5 area %, more preferably, 1.5 to 4 area %.

Meanwhile, when the area fracture of the ceramics 122a included in the second internal electrode 121 exceeds 0.5 area %, it means that a sintering temperature difference between the first internal electrode 121 and the second internal electrode 122 is not great enough, and the first and second internal electrodes may be thus sintered at a similar temperature, such that constrained sintering may not be sufficiently conducted.

In this case, a thickness t1 of the first internal electrode 121 may be greater than a thickness t2 of the second internal electrode 122, after sintering the first and second internal electrodes 121 and 122. The reason is that that second internal electrode 122 is subjected to a constrained sintering effect by the first internal electrode 121 that is first sintered to become hard, as described above.

In addition, $1.05 \leq t1/t2 \leq 1.6$ in which t1 is the thickness of the first internal electrode 121 and t2 is the thickness of the second internal electrode 122.

When t1/t2 is less than 1.05, a thinning effect of the second internal electrode 122 may not be sufficient. On the other hand, when t1/t2 exceeds 1.6, the thickness t1 of the first internal electrode is excessively great, such that it may be difficult to achieve miniaturization of the multilayer capacitor, and the thickness t2 of the second internal electrode may be excessively small, such that electrode connectivity may be decreased and capacitance may thus be decreased.

In addition, the thickness t1 of the first internal electrode 121 may be 0.2 to 1.0 μm, and the thickness t2 of the second internal electrode 122 may be 0.14 to 0.95 μm. Even though the range of the thickness t1 and the range of the thickness t2 partially overlap with each other, once one of the thickness t1 and the thickness t2 is determined, the other one of the thickness t1 and the thickness t2 may be determined in consideration of the above described relations between the thickness t1 and the thickness t2. The second internal electrode 122 may be formed at the lower thickness than the first internal electrode 121, such that miniaturization of the entire multilayer capacitor may be achieved.

In addition, a thickness td of the dielectric layer may be 0.14 to 0.95 μm, after sintering the first and second internal electrodes 121 and 122. The dielectric layer 111 may be formed at a low thickness by the same principle as a principle of the constrained sintering of the second internal electrode 122. The dielectric layer 111 may be formed at the low thickness, such that miniaturization of the entire multilayer capacitor may be achieved. In addition, since a forming film of the dielectric layer is maintained at a great thickness before the sintering process and is induced to be shrunk in the thickness direction in the sintering process, the dielectric layer may be thinned while decreasing a defect in and a stack defect of the forming film that may occur due to a low thickness of the forming film. When the thickness td of the dielectric layer exceeds 0.95 μm, a thinning effect of the dielectric layer may be decreased, and when the thickness td of the dielectric layer is less than 0.14 μm, withstand voltage characteristics and reliability may be decreased.

In order to decrease the thicknesses of the second internal electrode 122 and the dielectric layer 111 by constrained-sintering the second internal electrode 122 and the dielectric layer 111 as described above, the first internal electrode 121 may be formed of the conductive paste having the sintering temperature lower than that of the conductive paste for forming the second internal electrode 122.

In this case, the first and second internal electrodes 121 and 122 may be formed of conductive pastes including conductive metal powder particles and ceramic materials, and an average particle size of the conductive metal powder particles included in the conductive paste for forming the first internal electrode 121 may be smaller than that of the conductive metal powder particles included in the conductive paste for forming the second internal electrode 122.

In addition, the first internal electrode 121 may be formed of the conductive paste including the conductive metal powder particles and the ceramic materials, and the average particle size of the conductive metal powder particles may be 100 nm or less. Generally, Ni powder particles having a size of 100 to 200 nm may be used as conductive powder particles used in order to form the internal electrode at a low thickness, and the smaller the average particle size of the conductive metal powder particles, the lower the sintering temperature of the conductive metal powder particles. Therefore, in order for the sintering temperature of the first internal electrode 121 to be lower than that of the second internal electrode 122, the average particle size of the conductive metal powder particles used in the first internal electrode 121 may be 100 nm or less, while the average particle size of the conductive metal powder particles used in the second internal electrode 122 may be greater than 100 nm and less than 200 nm.

In addition, the first internal electrode 121 may include a Ni alloy alloyed with one or more materials selected from the group consisting of Cu, Si, and Al. The reason is that the Ni alloy alloyed with one or more materials selected from the group consisting of Cu, Si, and Al may lower the sintering temperature of the first internal electrode 121 to make early shrinkage of the first internal electrode possible.

Meanwhile, the second internal electrode 122 may include a Ni alloy alloyed with one or more materials selected from the group consisting of W, Cr, and Co. The Ni alloy alloyed with one or more materials selected from the group consisting of W, Cr, and Co may serve to raise the sintering temperature of the second internal electrode 122 to retard shrinkage of the second internal electrode 122. That is, the Ni alloy included in the first internal electrode 121 and the Ni alloy included in the second internal electrode 122 may be different from each other.

In addition, the second internal electrode 122 may be formed of the conductive paste including the conductive metal powder particles and the ceramic materials, and the conductive metal powder particles may be coated with sulfur (S) or carbon (C). The reason is that when the conductive metal powder particles coated with sulfur (S) or carbon (C) may raise the sintering temperature of the second internal electrode to retard shrinkage of the second internal electrode.

In addition, the second internal electrode 122 may include a Ni grain, ceramics distributed in the Ni grain, a first coating layer surrounding the Ni grain, and second coating layers surrounding the ceramics.

The first coating layer surrounding the Ni grain may suppress the Ni grain from being externally grown, the ceramics around which the second coating layers are formed may suppress movement of Ni particles to suppress an internal electrode lumping phenomenon and an internal electrode breakage phenomenon, thereby allowing the second internal electrode to be formed at a low thickness.

In addition, the first coating layer surrounding the Ni grain may raise the sintering temperature of the second internal electrode to retard the shrinkage of the second internal electrode, thereby allowing the second internal electrode to be subjected to the constrained sintering effect by the first internal electrode that is early shrunk to be formed at the low thickness.

In this case, each of the first and second coating layers may include a metal that has a melting point lower than that of Ni, is hardly solid-solved in Ni, and has good wettability with Ni. Such a metal may be added to the conductive paste for forming the internal electrode to uniformly coat a surface of the Ni grain in a sintering process and uniformly coat surface of the ceramics.

An example of the metal that has the melting point lower than that of Ni, is hardly solid-solved in Ni, and has the good wettability with Ni may include Ag, Au, Zn, Sn, In, Al, Bi, Sb, Ge, and Te.

Therefore, each of the first and second coating layers may include one or more materials selected from the group consisting of Ag, Au, Zn, Sn, In, Al, Bi, Sb, Ge, and Te.

Further, the second internal electrode 122 and the dielectric layer 111 may be formed at smaller thicknesses by combining the method of lowering the sintering temperature of the first internal electrode and the method of raising the sintering temperature of the second internal electrode described above with each other.

Meanwhile, the number of first internal electrodes 121 may be two or more, and the second internal electrode 122 may be disposed between the two or more first internal electrodes 121. This is to obtain the constrained sintering effect of the second internal electrode by the first internal electrodes, and at least two first internal electrodes may exist so that the second internal electrode is disposed between the first internal electrodes. Such a configuration will be described with reference to FIG. 2B below.

FIG. 2B is a cross-sectional view of a portion of a capacitance forming region of a multilayer capacitor according to an exemplary embodiment in the present disclosure. Referring to FIG. 2B, the first internal electrode 121, the second internal electrode 122, the second internal electrode 122, the second internal electrode 122, the second internal electrode 122, and the first internal electrode 121 may be sequentially disposed in this order with respective dielectric layers interposed therebetween. For example, by numbering, with consecutive natural numbers n+1 to n+6, in which n is a natural number, the sequentially stacked internal electrodes in the above described order in the thickness direction, odd numbered internal electrodes among the sequentially stacked internal electrodes may be connected to one of the external electrodes 131 and 132 and have the same polarity, and even numbered internal electrodes among the sequentially stacked internal electrodes may be connected to another of the external electrodes 131 and 132 and have the same polarity but different from that of the odd numbered internal electrodes. In other words, the internal electrodes having the same polarity may have the same thickness or different thicknesses, depending on the order of the stacked first and second internal electrodes 131 and 132.

As another example, the second internal electrode, the second internal electrode, the first internal electrode, the second internal electrode, the second internal electrode, the second internal electrode, the first internal electrode, the second internal electrode, the first internal electrode, and the second internal electrode may be sequentially disposed in this order with respective dielectric layers interposed therebetween.

Similar to the example shown in FIG. 2B, by numbering, with consecutive natural numbers, the sequentially stacked internal electrodes in the above described order in the thickness direction, odd numbered internal electrodes among the sequentially stacked internal electrodes may be connected to one of the external electrodes and have the same polarity, and even numbered internal electrodes among the sequentially stacked internal electrodes may be connected to another of the external electrodes and have the same polarity but different from that of the odd numbered internal electrodes. In other words, the internal electrodes having the same polarity may have the same thickness or different thicknesses, depending on the order of the stacked first and second internal electrodes. In this case, polarities of a plurality of first internal electrodes 121 may be different from each other, and polarities of a plurality of second internal electrodes 122 may be different from each other.

Further, referring to FIG. 2B, the first and second internal electrodes 121 and 122 may be alternately disposed with respective dielectric layers 111 interposed therebetween, and may be alternately exposed through both end surfaces of the body, respectively. That is, the first and second internal electrodes 121 and 122 may be disposed to be alternately exposed through the third and fourth surfaces 3 and 4 respectively, with respective dielectric layers 111 interposed therebetween. Therefore, a manufacturing process may be simplified, and the constrained sintering effect may further be improved.

In this case, polarities of a plurality of first internal electrodes 121 may be the same as each other, and polarities of a plurality of second internal electrodes 122 may be the same as each other.

The external electrodes 131 and 132 may be disposed on the body 110, and may be connected to the internal electrodes 121 and 122, respectively. As in a form illustrated in FIG. 2A, the external electrodes may include first and second external electrodes 131 and 132 disposed on the third and fourth surfaces 3 and 4 of the body, respectively, to be connected to the first and second internal electrodes 121 and 122, respectively. A structure in which the multilayer capacitor 100 includes two external electrodes 131 and 132 is described in the present exemplary embodiment, but the number, shapes, or the like, of external electrodes 131 and 132 may be changed depending on shapes of the internal electrodes 121 and 122 or other purposes.

Meanwhile, the external electrodes 131 and 132 may be formed of any material having electrical conductivity, such as a metal, or the like, a certain material of each of the external electrodes 131 and 132 may be determined in consideration of electrical characteristics, structural stability, or the like, and the external electrodes 131 and 132 may have a multilayer structure.

For example, the external electrodes 131 and 132 may include electrode layers 131a and 132a disposed on the body 110, first plating layers 131b and 132b formed on the electrode layers 131a and 132a, and second plating layers 131c and 132c formed on the first plating layers 131b and 132b, respectively.

As a more specific example, the electrode layers 131a and 132a may be sintered electrodes including a conductive metal w and a glass. The conductive metal may be copper (Cu). Alternatively, the electrode layers 131a and 132a may be resin-based electrodes including a plurality of metal particles and a conductive resin.

The first plating layers 131b and 132b may be Ni plating layers and the second plating layers 131c and 132c may be Sn plating layers, but the first plating layers 131b and 132b and the second plating layers 131c and 132c are not limited thereto.

FIGS. 4A through 4C are views sequentially illustrating processes of sintering a general multilayer capacitor according to the related art, which is a Comparative Example. FIGS. 5A through 5C are views sequentially illustrating processes of sintering a multilayer capacitor according to an exemplary embodiment in the present disclosure, which is an Inventive Example.

FIGS. 4A and 5A illustrate a state in which ceramic sheets having internal electrodes printed thereon are stacked, FIGS. 4B and 5B illustrate a state in which the internal electrodes are being sintered, and FIGS. 4C and 5C illustrate a state in which sintering of the internal electrodes is completed.

In a case in which internal electrodes 321 and 322 are printed on ceramic sheets 311 using the same conductive paste and the ceramic sheets 311 are then stacked as illustrated in FIGS. 4A through 4C, as sintering is performed on the internal electrodes while raising a temperature, a first internal electrode 321' and a second internal electrode 322' may be simultaneously sintered, such that shrinkage in the first and second internal electrodes 321' and 322' and a dielectric layer 311' may be generated in all directions. Therefore, after the sintering is completed, a thickness t11 of the first internal electrode 11 and a thickness t21 of the second internal electrode may be the substantially same as each other, if the initial thicknesses of the first internal electrode 321 and the second internal electrode 322 are substantially the same. In the present disclosure, thicknesses being "substantially the same" means that the thicknesses are exactly the same, or means that a difference between the thicknesses caused by, for example, manufacturing or measurement error/margin, is within a tolerance acceptable to one of ordinary skill in the art.

On the other hand, in a case in which a first internal electrode is formed using a conductive paste 421 having a sintering temperature lower than that of a conductive paste 422 for forming a second internal electrode as illustrated in FIGS. 5A through 5C, as sintering is performed on the internal electrodes while raising a temperature, a first internal electrode 421' may be first sintered to become hard, and may induce shrinkage of a second internal electrode 422' and a dielectric layer 411' to be accelerated in the thickness direction when the second internal electrode 422' and the dielectric layer 411' sintered at a high temperature are sintered and shrunk. Therefore, a thickness t22 of the second internal electrode may be smaller than a thickness t12 of the first internal electrode, if the initial thicknesses of the first internal electrode 421 and the second internal electrode 422 are substantially the same.

In addition, it may be confirmed that an area fraction of ceramics included in a first internal electrode 421" is greater than that of ceramics included in a second internal electrode 422".

In addition, it may be confirmed that the thickness t22 of the second internal electrode 421" and a thickness td2 of a dielectric layer 411" in FIG. 5C are smaller than the thickness t21 of the second internal electrode 321" and a thickness td1 of a dielectric layer 311" in FIG. 4C, respectively, when the initial thicknesses of the second internal electrodes 321 and 421 are the same and the initial thicknesses of the dielectric layers 311 and 411 are substantially the same.

A conductive paste including Ni powder particles having an average particle size of 150 nm and ceramic powder particles of which a content is 10 wt % based on a content of the Ni powder particles was used as the conductive pastes in the internal electrodes 321, 322, and 422 of FIGS. 4A through 5C, a conductive paste including Ni powder particles having an average particle size of 80 nm and ceramic powder particles of which a content is 10 wt % based on a content of the Ni powder particles was used as the conductive paste in the internal electrode 421 of FIGS. 5A-5C, and other conditions were the same as each other.

As a measurement result of sizes of multilayer capacitors manufactured according to FIGS. 4A through 5C, the size of the multilayer capacitor manufactured according to FIGS. 4A through 4C was a length of 541 μm, a width of 318 μm, and a thickness of 306 μm, and the size of the multilayer capacitor manufactured according to FIGS. 5A through 5C was a length of 570 μm, a width of 337 μm, and a thickness of 270 μm. Therefore, it could be confirmed that shrinkage behavior in the thickness direction is greater by 10% or more in an exemplary embodiment in the present disclosure than in the related art.

Lengths, widths, and thicknesses of the multilayer capacitor (Comparative Example) manufactured according to FIGS. 4A through 4C and the multilayer capacitor (Inventive Example) manufactured according to FIGS. 5A through 5C, thicknesses of the first and second internal electrodes of these multilayer capacitors, area fractures of ceramics included in the first and second internal electrodes, and thicknesses of the dielectric layers of these multilayer capacitors are measured and represented in Table 1.

TABLE 1

| Division | Length (μm) | Width (μm) | Thickness (μm) | First Internal Electrode | | Second Internal Electrode | | Thickness (μm) of Dielectric Layer |
|---|---|---|---|---|---|---|---|---|
| | | | | Thickness (μm) | area % of Ceramics | Thickness (μm) | area % of Ceramics | |
| Comparative Example | 541 | 318 | 306 | 0.7 | 0.3 | 0.7 | 0.3 | 0.7 |
| Inventive Example | 570 | 337 | 270 | 0.7 | 2.2 | 0.45 | 0.3 | 0.4 |

A multilayer capacitor 200 according to another exemplary embodiment in the present disclosure will hereinafter be described in detail. However, a description of contents overlapping those of the multilayer capacitor according to the exemplary embodiment in the present disclosure is omitted.

Figure 6:
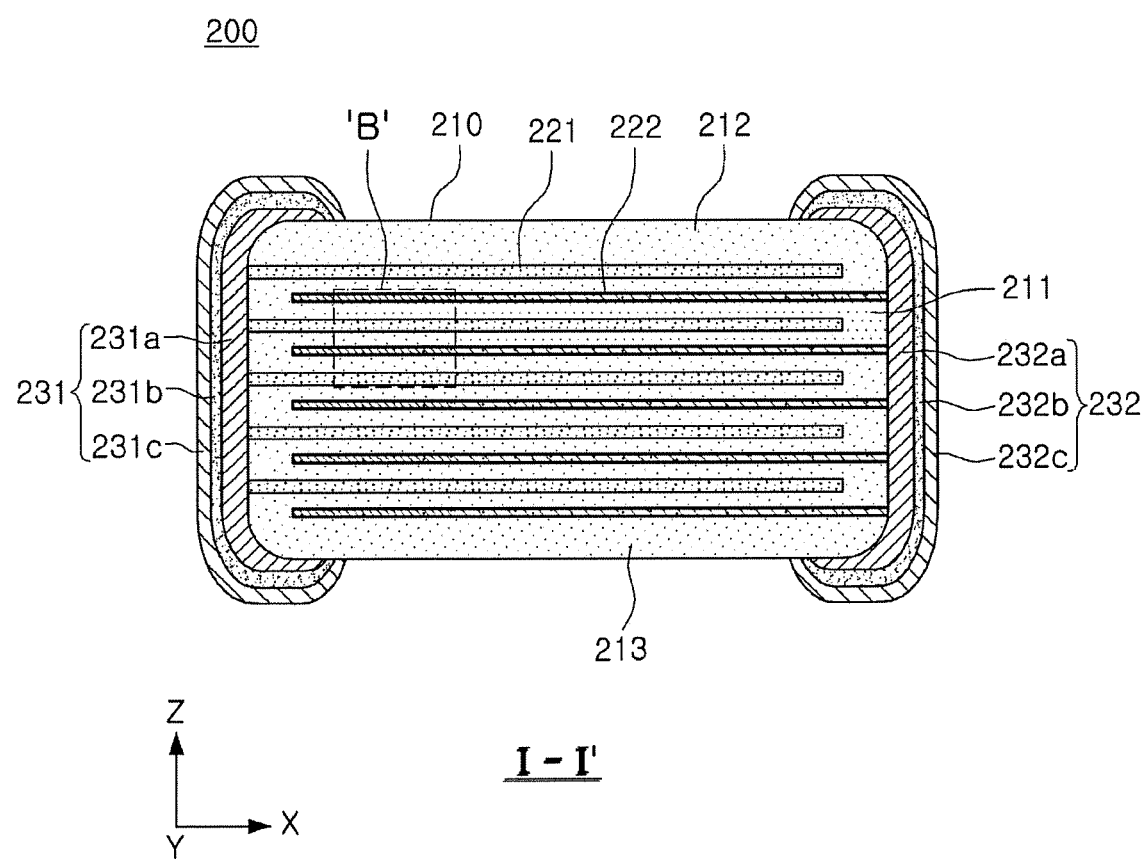
FIG. 6 is a cross-sectional view of a multilayer capacitor according to another exemplary embodiment in the present disclosure taken along line I-I'.
Figure 7:
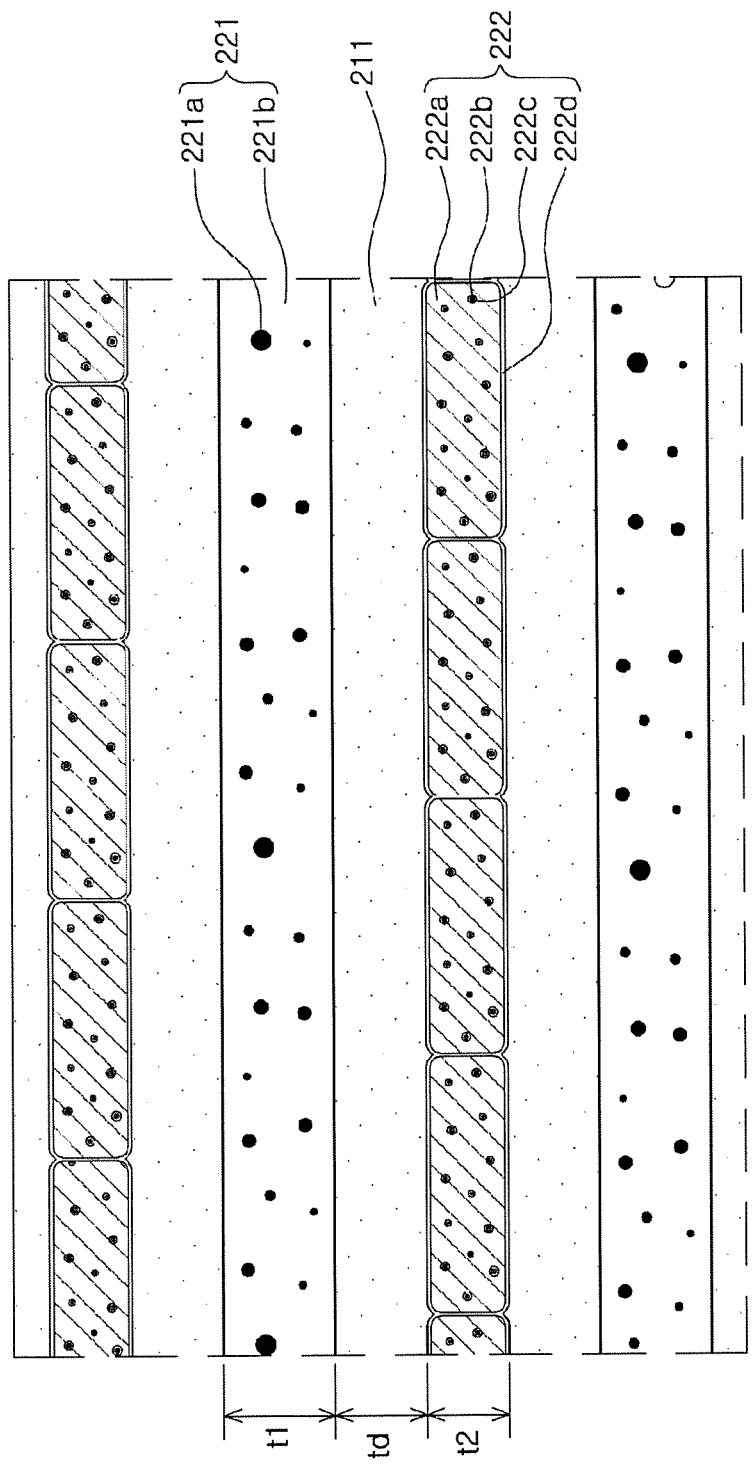
FIG. 7 is an enlarged view of part B of FIG. 6.

FIG. 6 is a cross-sectional view taken along line I-I' (the same as line I-I' of FIG. 1) of a multilayer capacitor 200 according to another exemplary embodiment in the present disclosure. FIG. 7 is an enlarged view of part B of FIG. 6.

The multilayer capacitor 200 according to another exemplary embodiment will be described with reference to FIGS. 6 and 7. The multilayer capacitor 200 according to an exemplary embodiment in the present disclosure may include a body 210 including dielectric layers 211 and internal electrodes 221 and 222 alternately disposed therein, and external electrodes 231 and 232 disposed on the body 210 and connected to the internal electrodes 221 and 222, respectively. An area fraction of ceramics 221a included in the first internal electrode 221 may be greater than that of ceramics included in the second internal electrode 222. Descriptions of 221a, 221b, 211 and relationship thereamong may be referred to those of 121a, 121b, 111 and thus will be omitted to avoid redundancy. The second internal electrode 222 may include a Ni grain 222a, ceramics 222b coated with second coating layers 222c surrounding thereof and distributed in the Ni grain, and a first coating layer 222d surrounding the Ni grain.

The first coating layer 222d surrounding the Ni grain may suppress the Ni grain 222a from being externally grown, and the ceramics 222b around which the second coating layers 222c are formed may suppress movement of Ni particles to suppress an internal electrode lumping phenomenon and an internal electrode breakage phenomenon, thereby allowing the second internal electrode 222 to be formed at a low thickness.

In addition, the first coating layer 222d surrounding the Ni grain may raise a sintering temperature of the second internal electrode to retard shrinkage of the second internal electrode, thereby allowing the second internal electrode to be subjected to a constrained sintering effect by a first internal electrode that is early shrunk to be formed at the low thickness.

The Ni grain 222a may be a polyhedron formed by regularly arranging Ni atoms.

Since the ceramics 222b have poor wettability with Ni, the ceramics 222b may serve to suppress the movement of Ni particles to suppress the internal electrode lumping phenomenon. The ceramics 222b may be formed by sintering ceramic materials added to a conductive paste for forming the internal electrode and then trapping the ceramic materials in the internal electrode.

A kind of ceramics 222b is not particularly limited as long as the ceramics 222b have poor wettability with Ni. For example, the ceramics 222b may include one or more materials selected from the group consisting of $BaTiO_3$, $CaTiO_3$, $SrTiO_3$, $BaZrO_3$, and $CaZrO_3$.

The first coating layer 222d may surround the Ni grain 222a. That is, the first coating layer may exist on a grain boundary of Ni. The first coating layer 222d may serve to suppress the Ni grain 222a from being externally grown to suppress the internal electrode breakage phenomenon and suppress the internal electrode lumping phenomenon.

The second coating layers 222c may surround outer portions of the ceramics 222b existing in the Ni grain.

The second coating layers 222c may serve to suppress an increase in a size of the ceramics 222b due to a contact between the ceramics 222b existing in the Ni grain.

In this case, each of the first and second coating layers may include a metal that has a melting point lower than that of Ni, is hardly solid-solved in Ni, and has good wettability with Ni. Such a metal may be added to the conductive paste for forming the internal electrode to uniformly coat a surface of the Ni grain in a sintering process and uniformly coat surface of the ceramics.

An example of the metal that has the melting point lower than that of Ni, is hardly solid-solved in Ni, and has the good wettability with Ni may include Ag, Au, Zn, Sn, In, Al, Bi, Sb, Ge, and Te.

Therefore, each of the first and second coating layers may include one or more materials selected from the group consisting of Ag, Au, Zn, Sn, In, Al, Bi, Sb, Ge, and Te.

Further, the second internal electrode 222 and the dielectric layer may be formed at smaller thicknesses by combining the method of lowering the sintering temperature of the first internal electrode and the method of raising the sintering temperature of the second internal electrode described in the multilayer capacitor according to the exemplary embodiment in the present disclosure with each other.

The multilayer capacitor 200 may further includes external electrodes 231 and 232. The external electrodes 231 and 232 may include electrode layers 231a and 232a disposed on a body 210, first plating layers 231b and 232b formed on the electrode layers 231a and 232a, and second plating layers 231c and 232c formed on the first plating layers 231b and 232b, respectively. Other descriptions of the elements represented by reference characters 231, 231a, 231b, 231c, 232, 232a, 232b, and 232c may refer to those descriptions of the elements represented by reference characters 131, 131a, 131b, 131c, 132, 132a, 132b, and 132c, and will be omitted to avoid redundancy.

As set forth above, according to an exemplary embodiment in the present disclosure, a multilayer capacitor of which an internal electrode and a dielectric layer have low thicknesses by controlling shrinkage behavior in a sintering process may be provided. Therefore, miniaturization and a capacitance increase of the multilayer capacitor may be achieved.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a body including dielectric layers and internal electrodes alternately disposed therein; and
external electrodes disposed on the body and connected to the internal electrodes, respectively,
wherein the internal electrodes include a first internal electrode and a second internal electrode, a thickness of the second internal electrode being less than a thickness of the first internal electrode, and
an area fraction of ceramics included in the first internal electrode with respect to the first internal electrode is greater than that of ceramics included in the second internal electrode with respect to the second internal electrode.

2. The multilayer capacitor of claim 1, wherein in a cross-sectional of the multilayer capacitor, the area fracture of the ceramics included in the first internal electrode is 1 to 5 area % of the first internal electrode, and the area fracture of the ceramics included in the second internal electrode is 0.5 area % or less of the second internal electrode.

3. The multilayer capacitor of claim 1, wherein $1.05 \leq t1/t2 \leq 1.6$ in which t1 is the thickness of the first internal electrode and t2 is the thickness of the second internal electrode.

4. The multilayer capacitor of claim 1, wherein the thickness of the first internal electrode is 0.2 to 1.0 µm, and the thickness of the second internal electrode is 0.14 to 0.95 µm.

5. The multilayer capacitor of claim 1, wherein a thickness of the dielectric layer is 0.14 to 0.95 µm.

6. The multilayer capacitor of claim 1, wherein the first internal electrode is made of a conductive paste having a sintering temperature lower than that of a conductive paste for making the second internal electrode.

7. The multilayer capacitor of claim 1, wherein the first and second internal electrodes are made of conductive pastes including conductive metal powder particles and ceramic powder particles, and
an average particle size of the conductive metal powder particles included in the conductive paste for making the first internal electrode is smaller than that of the conductive metal powder particles included in the conductive paste for making the second internal electrode.

8. The multilayer capacitor of claim 1, wherein the first internal electrode is made of a conductive paste including conductive metal powder particles and ceramic materials, and an average particle size of the conductive metal powder particles is 100 nm or less.

9. The multilayer capacitor of claim 1, wherein the first internal electrode includes a Ni alloy alloyed with one or more materials selected from the group consisting of Cu, Si, and Al.

10. The multilayer capacitor of claim 1, wherein the second internal electrode includes a Ni alloy alloyed with one or more materials selected from the group consisting of W, Cr, and Co.

11. The multilayer capacitor of claim 1, wherein the first internal electrode includes a Ni alloy different from a Ni alloy included in the second internal electrode.

12. The multilayer capacitor of claim 1, wherein the second internal electrode is made of a conductive paste including conductive metal powder particles and ceramic powder particles, and the conductive metal powder particles are coated with sulfur (S) or carbon (C).

13. The multilayer capacitor of claim 1, wherein the second internal electrode includes a Ni grain, ceramics distributed in the Ni grain, a first coating layer surrounding the Ni grain, and second coating layers surrounding the ceramics.

14. The multilayer capacitor of claim 13, wherein each of the first and second coating layers includes one or more materials selected from the group consisting of Ag, Au, Zn, Sn, In, Al, Bi, Sb, Ge, and Te.

15. The multilayer capacitor of claim 1, wherein the number of first internal electrodes is two or more, and
the second internal electrode is disposed between the two or more first internal electrodes.

16. The multilayer capacitor of claim 1, wherein the first and second internal electrodes are alternately disposed with respective dielectric layers interposed therebetween, and are alternately exposed through both end surfaces of the body, respectively.

17. A multilayer capacitor comprising:
a body including dielectric layers and internal electrodes alternately disposed therein; and
external electrodes disposed on the body and connected to the internal electrodes, respectively,
wherein the internal electrodes include a first internal electrode and a second internal electrode having a thickness lower than that of the first internal electrode, and
among the first and second internal electrodes, only the second internal electrode includes a Ni grain, ceramics distributed in the Ni grain, a first coating layer surrounding the Ni grain, and second coating layers surrounding the ceramics.

18. The multilayer capacitor of claim 17, wherein each of the first and second coating layers includes one or more materials selected from the group consisting of Ag, Au, Zn, Sn, In, Al, Bi, Sb, Ge, and Te.

19. The multilayer capacitor of claim 17, wherein the first internal electrode does not include the first and second coating layers.

20. A multilayer capacitor comprising:
a body including a first dielectric layer and first and second internal electrodes connected to each other by the first dielectric layer; and
first and second external electrodes disposed on the body and connected to the first and second internal electrodes, respectively,
wherein a thickness of the second internal electrode is less than a thickness of the first internal electrode, and
the first internal electrode is made of a first conductive paste having a sintering temperature lower than that of a second conductive paste for making the second internal electrode.

21. The multilayer capacitor of claim 20, wherein the first internal electrode includes a first Ni alloy alloyed with one or more materials selected from the group consisting of Cu, Si, and Al, and
the second internal electrode includes a second Ni alloy alloyed with one or more materials selected from the group consisting of W, Cr, and Co.

22. The multilayer capacitor of claim 20, wherein the second internal electrode is made of a conductive paste including conductive metal powder particles and ceramic powder particles, and the conductive metal powder particles are coated with sulfur (S) or carbon (C).

23. The multilayer capacitor of claim 20, wherein the second internal electrode includes a Ni grain, ceramics coated with second coating layers and distributed in the Ni grain, and a first coating layer surrounding the Ni grain.

24. The multilayer capacitor of claim 23, wherein each of the first and second coating layers includes one or more materials selected from the group consisting of Ag, Au, Zn, Sn, In, Al, Bi, Sb, Ge, and Te.

25. The multilayer capacitor of claim 20, wherein the body further includes a second dielectric layer and third and fourth internal electrodes connected to each other by the second dielectric layer,
the first and second external electrodes are connected to the third and fourth internal electrodes, respectively,
a thickness of the fourth internal electrode is less than a thickness of the third internal electrode, and
the third internal electrode is made of the first conductive paste and the fourth internal electrode is made of the second conductive paste.

26. The multilayer capacitor of claim 20, wherein the body further includes a second dielectric layer and third and fourth internal electrodes connected to each other by the second dielectric layer,
the first and second external electrodes are connected to the third and fourth internal electrodes, respectively,
a thickness of the third internal electrode is less than a thickness of the fourth internal electrode, and
the third internal electrode is made of the second conductive paste and the fourth internal electrode is made of the first conductive paste.

* * * * *